United States Patent
Sato et al.

(10) Patent No.: US 10,270,099 B2
(45) Date of Patent: Apr. 23, 2019

(54) POSITIVE ELECTRODE FOR LITHIUM-ION SECONDARY BATTERY, PRODUCTION PROCESS FOR THE SAME, AND LITHIUM-ION SECONDARY BATTERY

(71) Applicant: KABUSHIKI KAISHA TOYOTA JIDOSHOKKI, Kariya-shi, Aichi (JP)

(72) Inventors: Yuuhi Sato, Kariya (JP); Manabu Miyoshi, Kariya (JP); Tatsuya Eguchi, Kariya (JP); Atsushi Saito, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 17 days.

(21) Appl. No.: 15/555,104

(22) PCT Filed: Mar. 4, 2016

(86) PCT No.: PCT/JP2016/001184
§ 371 (c)(1),
(2) Date: Sep. 1, 2017

(87) PCT Pub. No.: WO2016/139957
PCT Pub. Date: Sep. 9, 2016

(65) Prior Publication Data
US 2018/0053936 A1 Feb. 22, 2018

(30) Foreign Application Priority Data
Mar. 4, 2015 (JP) ................... 2015-042747

(51) Int. Cl.
*H01M 4/38* (2006.01)
*H01M 4/58* (2010.01)
(Continued)

(52) U.S. Cl.
CPC ......... *H01M 4/5825* (2013.01); *H01M 4/364* (2013.01); *H01M 4/366* (2013.01);
(Continued)

(58) Field of Classification Search
CPC ...... H01M 4/364; H01M 4/366; H01M 4/386; H01M 4/505; H01M 4/525; H01M 4/5825;
(Continued)

(56) References Cited

U.S. PATENT DOCUMENTS

| | | |
|---|---|---|
| 2012/0231341 A1 | 9/2012 | Kim et al. |
| 2012/0244334 A1 | 9/2012 | Park et al. |
| 2014/0212756 A1 | 7/2014 | Sakaguchi et al. |

FOREIGN PATENT DOCUMENTS

| | | |
|---|---|---|
| JP | 2003-203628 A | 7/2003 |
| JP | 2003-292309 A | 10/2003 |

(Continued)

*Primary Examiner* — Brittany L Raymond
(74) *Attorney, Agent, or Firm* — Sughrue Mion, PLLC

(57) ABSTRACT

A positive electrode for lithium-ion secondary battery includes: a lithium metallic oxide with a lamellar rock-salt structure including nickel, cobalt, and manganese; and a phosphate/carbon composite including an olivine-type phosphate compound at least some of which is coated with carbon partially. A rate of a volume resistivity of the phosphate/carbon composite to a volume resistivity of the lithium metallic oxide is 0.034 or less. The olivine-type phosphate compound is expressed by a general formula: $LiM_hPO_4$ (where "M" is at least one element selected from the group consisting of Mn, Fe, Co, Ni, Cu, Mg, Zn, V, Ca, Sr, Ba, Ti, Al, Si, B, Te and Mo, and $0<"h"<2$). A content of the phosphate/carbon composite is from 15% by mass or more to 35% by mass or less when a summed mass of the lithium metallic oxide and the phosphate/carbon composite is taken as 100% by mass.

8 Claims, 4 Drawing Sheets

(51) Int. Cl.
*H01M 10/052* (2010.01)
*H01M 10/0566* (2010.01)
*H01M 4/36* (2006.01)
*H01M 4/505* (2010.01)
*H01M 4/525* (2010.01)
*H01M 4/62* (2006.01)
*H01M 4/02* (2006.01)

(52) U.S. Cl.
CPC ........... *H01M 4/386* (2013.01); *H01M 4/505* (2013.01); *H01M 4/525* (2013.01); *H01M 4/625* (2013.01); *H01M 10/052* (2013.01); *H01M 10/0566* (2013.01); *H01M 2004/027* (2013.01); *H01M 2004/028* (2013.01); *Y02P 70/54* (2015.11)

(58) Field of Classification Search
CPC ........... H01M 4/625; H01M 2004/027; H01M 2004/028; H01M 10/052; H01M 10/0566; Y02E 60/122; Y02T 10/7011; Y02P 70/54
See application file for complete search history.

(56) References Cited

FOREIGN PATENT DOCUMENTS

| | | |
|---|---|---|
| JP | 2012-190786 A | 10/2012 |
| JP | 2012-204079 A | 10/2012 |
| JP | 2012-216473 A | 11/2012 |
| JP | 2014-029863 A | 2/2014 |
| JP | 2014-179176 A | 9/2014 |
| JP | 2014-194879 A | 10/2014 |
| WO | 2013/018758 A1 | 2/2013 |
| WO | 2014/080608 A1 | 5/2014 |

POSITIVE ELECTRODE FOR LITHIUM-ION SECONDARY BATTERY, PRODUCTION PROCESS FOR THE SAME, AND LITHIUM-ION SECONDARY BATTERY

CROSS REFERENCE TO RELATED APPLICATIONS

This application is a National Stage of International Application No. PCT/JP2016/001184 filed Mar. 4, 2016, claiming priority based on Japanese Patent Application No. 2015-042747 filed Mar. 4, 2015, the contents of all of which are incorporated herein by reference in their entirety.

TECHNICAL FIELD

The present invention relates to a positive electrode for lithium-ion secondary battery comprising a positive-electrode active material, a production process for the same, and a lithium-ion secondary battery.

BACKGROUND ART

Recently, as accompanied by the developments of portable electronic instruments, such as notebook personal computers and cellular phones, and the practical applications of electric automobiles, small-sized, lightweight and high-capacity secondary batteries have been needed. As a high-capacity secondary battery meeting the desires, lithium-ion secondary batteries have been developed.

As a positive-electrode active material for lithium-ion secondary battery, lithium metallic oxides, such as $LiNi_{0.5}Co_{0.2}Mn_{0.3}O_2$ and $LiMn_2O_4$, are given, for instance. Whereas the lithium metallic oxides have high energy densities, the lithium metallic oxides are of low thermal stability.

Meanwhile, another positive-electrode active material for lithium-ion secondary battery, an olivine-type phosphate compound, such as $LiFePO_4$, is given. The olivine-type phosphate compound is less likely to release oxygen even when being heated to a high temperature, and is superior in the thermal stability (see patent application Publication Nos. 1 through 4).

Hence, patent application Publication No. 5 proposes to mix a lithium metallic oxide with an olivine-type phosphate compound in an appropriate mass ratio to use as a positive-electrode active material.

CITATION LIST

Patent Literature

Patent application Publication No. 1: International Publication No. 2013/018758;
Patent application Publication No. 2: Japanese Unexamined Patent Publication (KOKAI) Gazette No. 2012-216473;
Patent application Publication No. 3: Japanese Unexamined Patent Publication (KOKAI) Gazette No. 2003-292309;
Patent application Publication No. 4: Japanese Unexamined Patent Publication (KOKAI) Gazette No. 2003-203628; and
Patent application Publication No. 5: Japanese Unexamined Patent Publication (KOKAI) Gazette No. 2012-190786

SUMMARY OF THE INVENTION

Technical Problem

However, even when a lithium metallic oxide is mixed with an olivine-type phosphate compound in a moderate compounding ratio, the thermal stability of positive electrode comes to be changed by the qualities and conditions of the both. The inventors of the present application have sought wholeheartedly for factors bringing about great influences on the positive-electrode thermal stability, in order to further enhance the thermal stability of battery.

The present invention is made in view of such circumstances. An object of the present invention is to provide a positive electrode for lithium-ion secondary battery, the positive electrode being of excellent thermal stability, a production process for the same, and a lithium-ion secondary battery using the same.

Solution to Problem

A positive electrode for lithium-ion secondary battery according to the present invention comprises:
a lithium metallic oxide with a lamellar rock-salt structure including nickel, cobalt, and manganese; and
a phosphate/carbon composite including an olivine-type phosphate compound at least some of which is coated with carbon partially;
the olivine-type phosphate compound being expressed by a general formula: $LiM_hPO_4$ (where "M" is at least one element selected from the group consisting of Mn, Fe, Co, Ni, Cu, Mg, Zn, V, Ca, Sr, Ba, Ti, Al, Si, B, Te and Mo, and 0<"h"<2);
a rate of a volume resistivity of the phosphate/carbon composite with respect to a volume resistivity of the lithium metallic oxide being 0.034 or less;
a content of the phosphate/carbon composite being from 15% by mass or more to 35% by mass or less when a summed mass of the lithium metallic oxide and the phosphate/carbon composite is taken as 100% by mass.

A production process for positive electrode for lithium-ion secondary battery according to the present invention is a process for producing the positive electrode for lithium-ion secondary battery as set forth above, and comprises:
a confirmation step of confirming whether a rate of a volume resistivity of the phosphate/carbon composite with respect to a volume resistivity of the lithium metallic oxide is 0.034 or less.

A lithium-ion secondary battery according to the present invention comprises:
the positive electrode for lithium-ion secondary battery as set forth above;
a negative electrode; and
a nonaqueous electrolytic solution.

Advantageous Effects of the Invention

Since the present invention comprises the aforementioned constituents, providing the following is possible: a positive electrode for lithium-ion secondary battery, the positive electrode being of excellent thermal stability; a production process for the same; and a lithium-ion secondary battery using the same.

DESCRIPTION OF THE EMBODIMENTS

Explanations will be hereinafter made in detail on the following: a positive electrode for lithium-ion secondary battery; a production process for the same; and a lithium-ion secondary battery using the same, all of which are directed to embodiments according to the present invention.

Positive Electrode for Lithium-ion Secondary Battery

A positive electrode for lithium-ion secondary battery according one of the present embodiments comprises a lithium metallic oxide, and a phosphate/carbon composite. The phosphate/carbon composite includes an olivine-type phosphate compound at least some of which is coated with carbon partially. A rate of a volume resistivity of the phosphate/carbon composite with respect to a volume resistivity of the lithium metallic oxide is 0.034 or less. The term, "volume resistivity," refers to an electric resistance per unit volume of each of the components. Hereinafter, a rate of a volume resistivity of the phosphate/carbon composite with respect to a volume resistivity of the lithium metallic oxide is also referred to as an "'LP'/'LO' volume-resistance ratio." A volume resistivity of the lithium metallic oxide falls allowably in a range of from 200 or more to 3,000 or less, or further falls preferably in a range of from 247 or more to 1,000 or less. When the volume resistivity of the lithium metallic oxide becomes larger than 3,000, a resistance of the lithium metallic compound becomes so high that there arises such a fear that, as a battery requiring output, a sufficient output is less likely to be sent out. When the volume resistivity of the lithium metallic oxide becomes smaller than 247, there arises such another fear as a rate of a volume resistivity of the phosphate/carbon composite with respect to the volume resistivity of the lithium metallic oxide is less likely to be made 0.034 or less. A volume resistivity of the phosphate/carbon composite is allowably 100 or less, and is further preferably 50 or less. When the volume resistivity of the phosphate/carbon becomes larger than 100, there arises such a still another fear as the thermal stability of positive electrode becomes insufficient.

Figure 1:
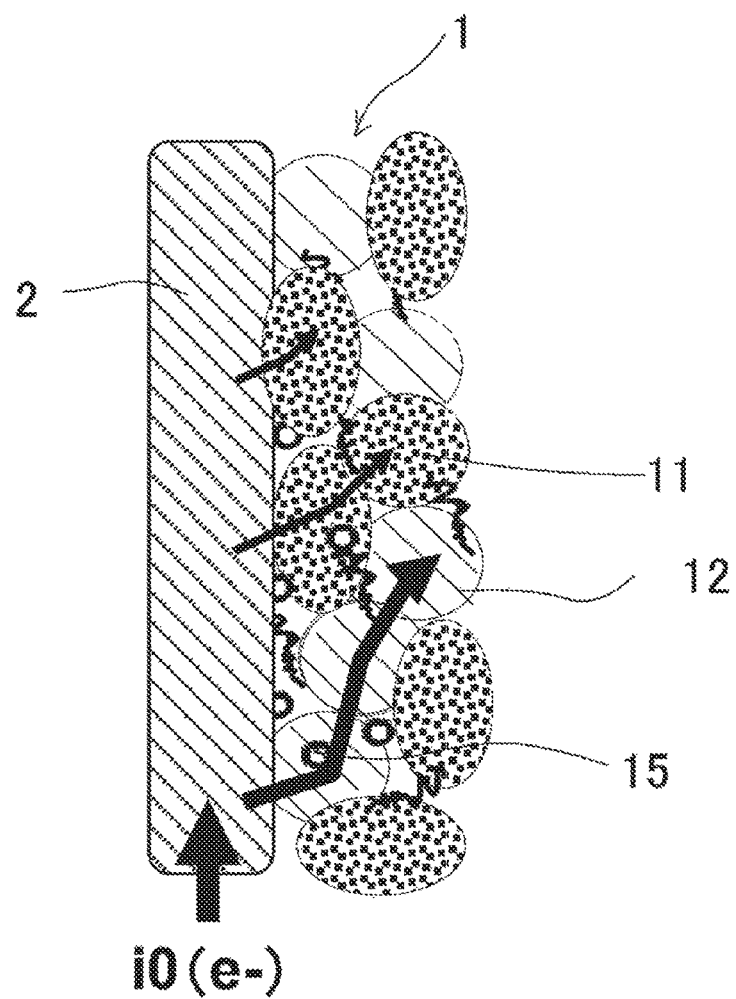
FIG. 1 is an explanatory diagram of across section in a positive electrode for lithium-ion secondary battery.

As illustrated in FIG. 1, when a current flows to a positive-electrode active-material layer 1 through a current collector 2, the current flows in both of lithium metallic oxides 11 and phosphate/carbon composites 12. In such a case as conductive additives 15 are involved in the positive-electrode active-material layer 11, the current flows in both of the lithium metallic oxides 1 and phosphate/carbon composites 12 by way of the conductive additives 15. A mixed electrode involving the lithium metallic oxides 11 and phosphate/carbon composite 12 is expressible with a parallel circuit of the lithium metallic oxides 11 and phosphate/carbon composite 12.

A current flows more in a low-resistance circuit. In a parallel circuit, the amount of a current is inversely proportional to the volume resistivity. Note herein that, whereas the lithium metallic oxides 11 have low thermal stability, the phosphate/carbon composites 12 have high thermal stability.

Hence, the phosphate/carbon composites 12 are made to have a low volume resistivity compared with the volume resistivity of the lithium metallic oxides 11. To be concrete, the rate (or the "LP"/"LO" volume-resistance ratio) of the volume resistivity of the phosphate/carbon composites 12 with respect to the volume resistivity of the lithium metallic oxides 11 is made 0.034 or less. Thus, at the time of short-circuiting, many of a current flows in the phosphate/carbon composites 12 of which the thermal stability is high. Accordingly, a large current is inhibited from flowing toward the lithium metallic oxides 11 of which the thermal stability is low, so that the lithium metallic oxides 11 are suppressed from decomposing thermally. Consequently, the thermal stability of positive electrode upgrades.

In the present embodiment, no matter how a compounding ratio is set between the lithium metallic oxide and the phosphate/carbon composite, a positive electrode with good thermal stability is obtainable for lithium-ion secondary battery by making the aforementioned "LP"/"LO" volume-resistance ratio 0.034 or less.

The "LP"/"LO" volume-resistance ratio is allowably 0.032 or less, further preferably 0.029 or less, or desirably 0.027 or less. In the instance, further enhancing the thermal stability of positive electrode is possible.

On the other hand, when the "LP"/"LO" volume-resistance ratio exceeds 0.034, such a fear arises as the thermal stability of positive electrode declines.

Carrying out a conventional method is possible to adjust the "LP"/"LO" volume-resistance ratio to 0.034 or less. For example, changing the following is allowed: the selection of types of the lithium metallic oxide; the selection of types of the olivine-type phosphate compound; and the coated condition and coating amount of carbon which coats the olivine-type phosphate compound. For example, Japanese Unexamined Patent Publication (KOKAI) Gazette No. 2014-194879 indicates that the volume resistivity of the phosphate/carbon composite reduces when increasing the coating amount of carbon.

Phosphate/carbon composites possessing various volume resistivities have been heretofore developed conventionally. Some of the examples are shown below. Japanese Unexamined Patent Publication (KOKAI) Gazette No. 2014-179176 discloses a phosphate/carbon composite possessing an arbitrary volume resistivity falling in a range of from 1 to 1,000 $\Omega$-cm at paragraph [0043]. Japanese Unexamined Patent Publication (KOKAI) Gazette No. 2014-029863 discloses a phosphate/carbon composite possessing various volume resistivities of 10,000 $\Omega$-cm or less for each of various sorts of compression strengths at paragraph [0187]. Japanese Unexamined Patent Publication (KOKAI) Gazette No. 2012-204079 discloses a phosphate/carbon composite of which the volume resistivity is from $2.3 \times 10^2$ to $4.6 \times 10^5$ $\Omega$-cm at paragraph [0057].

The positive electrode for lithium-ion secondary battery according to the present embodiment comprises the lithium metallic oxide, and the phosphate/carbon composite.

The lithium metallic oxide possesses a lamellar rock-salt structure, and is a lithium-nickel-cobalt-manganese-based composite oxide including nickel, cobalt and manganese. As for the lithium metallic oxide, the following are preferable from the standpoint of having a high capacity: compounds (hereinafter, being sometimes referred to as "NCM") with a lamellar rock-salt structure, the compounds expressed by a general formula: $Li_aNi_bCo_cMn_dD_eO_f$ (where $0.2 \leq \text{"a"} \leq 1.7$, "b"+"c"+"d"+"e"=1, $0 \leq \text{"e"} < 1$, "D" is at least one element selected from the group consisting of Li, Fe, Cr, Cu, Zn, Ca, Mg, Zr, S, Si, Na, K and Al, and $1.7 \leq \text{"f"} \leq 2.1$).

In the aforementioned general formula: $Li_aNi_bCo_cMn_d$-$D_eO_f$ (where $0.2 \leq \text{"a"} \leq 1.7$, $\text{"b"}+\text{"c"}+\text{"d"}+\text{"e"}=1$, $0 \leq \text{"e"}<1$, "D" is at least one element selected from the group consisting of Li, Fe, Cr, Cu, Zn, Ca, Mg, Zr, S, Si, Na, K and Al, and $1.7 \leq \text{"f"} \leq 2.1$), the values of "b," "c" and "d" are not restricted especially as far as the values satisfy the aforementioned conditions. However, "b," "c" and "d" are allowably as follows: $0<\text{"b"}<1$; $0<\text{"c"}<1$; and $0<\text{"d"}<1$. Moreover, at least one of "b," "c" and "d" preferably falls in the following ranges: $0<\text{"b"}<80/100$; $0<\text{"c"}<70/100$; and $10/100<\text{"d"}<1$. At least one of "b," "c" and "d" more preferably falls in the following ranges: $10/100<\text{"b"}<68/100$; $12/100<\text{"c"}<60/100$; and $20/100<\text{"d"}<68/100$. At least one of "b," "c" and "d" much more preferably falls in the following ranges: $25/100<\text{"b"}<60/100$; $15/100<\text{"c"}<50/100$; and $20/100<\text{"d"}<60/100$. At least one of "b," "c" and "d" especially preferably falls in the following ranges: $1/3 \leq \text{"b"} \leq 50/100$; $20/100 \leq \text{"c"} \leq 1/3$; and $20/100 \leq \text{"d"} \leq 1/3$.

The value of "a" is preferably falls within such a range as $0.5 \leq \text{"a"} \leq 1.5$; more preferably within such another range as $0.7 \leq \text{"a"} \leq 1.3$; or much more preferably within such still another range as $0.9 \leq \text{"a"} \leq 1.2$. As to "e" and "f," numerical values falling within the ranges which the general formula prescribes are allowable, and the following are exemplifiable: "e"=0; and "f"=2.

As for a specific example of the lithium metallic oxide possessing a lamellar rock-salt structure, an allowable lithium metallic oxide is at least one member selected from the group consisting of $LiNi_{0.5}CO_{0.2}Mn_{0.3}O_2$, $LiNi_{0.5}Co_{0.3}Mn_{0.2}O_2$, $LiNi_{1/3}Co_{1/3}Mn_{1/3}O_2$, $LiNi_{0.5}Mn_{0.5}O_2$, $LiNi_{0.75}Co_{0.1}Mn_{0.15}O_2$, $LiMnO_2$, $LiNiO_2$, and $LiCoO_2$.

As for the lithium metallic oxide, using a solid solution is also possible, the solid solution made up of a mixture of an ingredient possessing a lamellar rock-salt structure with another ingredient possessing a spinel structure. As a lithium metallic oxide possessing a spinel structure and to be mixed in a lithium metallic composite oxide with a lamellar rock-salt structure, lithium metallic oxides are allowable, the lithium metallic oxides expressed by a general formula: $Li_x(A_yMn_{2-y})O_4$ (where "A" is at least one element selected from the group consisting of Ca, Mg, S, Si, Na, K, Al, P, Ga and Ge, and at least one metallic element selected from the group consisting of transition metal elements, $0<\text{"x"} \leq 2.2$, and $0<\text{"y"} \leq 1$). An allowable transition metal element capable of making up "A" in the general formula is, for instance, at least one element selected from the group consisting of Fe, Cr, Cu, Zn, Zr, Ti, V, Mo, Nb, W, La, Ni and Co. For example, $LiNi_{0.5}Mn_{1.5}O_4$ or $LiMn_2O_4$ is given.

The lithium metallic oxide is not at all restricted especially as to the configuration. However, in terms of the average particle diameter, the lithium metallic oxide preferably has an average particle diameter of 100 µm or less, more preferably from 0.1 µm or more to 50 µm or less, or most preferably from 1 µm or more to 10 µm or less. Being less than 0.1 µm leads sometimes to causing such a drawback as the adhesiveness to current collectors is likely to be impaired upon manufacturing electrodes. Going beyond 100 µm leads sometimes to causing such another drawback as the size of electrodes are affected or separators constituting secondary batteries have been damaged. Note that the "average particle diameter" in the present description means the value of $D_{50}$ when measured with a common laser diffraction-type grain-size distribution measuring apparatus.

The phosphate/carbon composite includes an olivine-type phosphate compound at least some of which is coated with carbon partially. The olivine-type phosphate compound has an olivine structure, and is expressed by a general formula: $LiM_hPO_4$ (where "M" is at least one element selected from the group consisting of Mn, Fe, Co, Ni, Cu, Mg, Zn, V, Ca, Sr, Ba, Ti, Al, Si, B, Te and Mo, and $0<\text{"h"}<2$). As for the olivine-type phosphate compound, $LiFePO_4$, $LiCoPO_4$, $LiNiPO_4$, or $LiMnPO_4$ is given, for instance. Among the olivine-type phosphate compounds, $LiFePO_4$ is preferable from the standpoint of thermal stability. The reasons are as follows. $LiFePO_4$ shows a comparatively flat discharging curve at the time of discharging. So, if the positive electrode and negative electrode of a lithium-ion secondary battery have been short-circuited to result in causing sudden or rapid discharging, sudden or rapid potential differences accompanied by the discharging are less likely to occur in locations at which $LiFePO_4$ exists. Consequently, $LiFePO_4$ is less likely to induce the transfer of charges from the other locations within an electrode, so that the occurrence of overcurrent is inhibitable. As a result, inhibiting secondary batteries suitably from generating heat is possible.

The phosphate/carbon composite preferably has an average particle diameter of from 0.8 to 18 µm, more preferably from 0.8 to 4.0 µm, or most preferably from 1.5 to 3.5 µm. When the average particle diameter of the phosphate/carbon composite is too small, the particles are likely to agglomerate so that there is a fear that such a problem occurs as admixing with the lithium metallic oxide is difficult. Moreover, when the average particle diameter of the phosphate/carbon composite is too large, there is another fear that such another problem occurs as locations at which $LiFePO_4$ exists within an electrode are so less upon being admixed with the lithium metallic oxide that the heat-generation inhibition effect is not obtained. In the present description, the "average particle diameter" of the phosphate/carbon composite refers to a $D_{50}$ of the phosphate/carbon composite.

In the positive electrode, the olivine-type phosphate compound is also allowed to exist as being the primary particles per se, or is even permitted to exist as the secondary particles in which the primary particles are agglomerated.

The olivine-type phosphate compound is not at all restricted especially as to the configuration. The olivine-type phosphate compound preferably has an average particle diameter of 100 µm or less, more preferably from 0.01 µm or more to 10 µm or less, or most preferably from 0.1 µm or more to 10 µm or less. The "average particle diameter" of the olivine-type phosphate composite refers to a $D_{50}$ of the secondary particles of the olivine-type phosphate compound which is not coated with carbon at all.

Moreover, the average particle diameter of the olivine-type phosphate compound is preferably smaller than the average particle diameter of the lithium metallic oxide.

The olivine-type phosphate compound is coated with carbon partially in at least some of the part as mentioned above. The carbon is allowed to coat on some of the surface of the olivine-type phosphate compound partially, is also permitted to coat the entire surface, or some of the carbon is even allowed to go into or intrude inside the particles.

As for a method of obtaining the phosphate/carbon composite, coating the olivine-type phosphate compound with carbon is possible by using a conventional carbon coating method. Appropriately selecting one of the conventional carbon coating methods to use leads to making the phosphate/carbon composite possessing an arbitrary volume resistivity obtainable. For example, the following carbon coating methods have been disclosed.

Japanese Unexamined Patent Publication (KOKAI) Gazette No. 2014-194879 discloses that a surface of particles comprising $Li_xA_yPO_4$ (where "A" is one or two members selected from the group consisting of Mn and Co, $0 \leq$ "x" $\leq 4$, and $0 <$ "y" $\leq 1.5$) is coated by a coating layer including one or two members selected from the group consisting of phosphorus-containing compounds and sulfur-containing compounds, and then a surface of the coating layer is further coated by a second coating layer including a carbonaceous electron-conductive material.

A method set forth in Japanese Unexamined Patent Publication (KOKAI) Gazette No. 2012-204079 is a production process for an olivine-type phosphate compound of which the composition is $Li_x(Mn_{1-y}M^1_y)_{1-z}M^2_zPO_4$ (in the formula, however, "x," "y," and "z" are $0.9 <$ "x" $< 1.3$, $0 \leq$ "y" $< 1$ and $0 <$ "z" $< 0.3$, respectively, "$M^1$" is at least one metallic element selected from the group consisting of Fe, Co and Ni, and "$M^2$" is at least one metallic element selected from the group consisting of Zn, Mo and Al). In the production process, the following are carried out: a step of preparing a slurry containing an oxide of phosphorus, a lithium source, a carbon source, an oxide of the metallic element "$M^2$," an oxide or hydroxide of phosphorus, and a solvent; a step of pulverizing particles included in the slurry; a step of spray drying the pulverized slurry to turn the slurry into a precursor; and a step of heat treating the precursor at from 500 to 800° C. in an inert atmosphere. As for the carbon source, one of the raw materials, sugars, such as glucose, sucrose and lactose, or organic compounds, such as glycerin, ascorbic acid, lauric acid and stearic acid, are employable. A carbon content in the olivine-type phosphate compound is allowably from 0.2% by weight or more to 10% by weight or less, and carbon exists preferably inside the secondary particles or on the surface. When the carbon content is less than 0.2% by weight, an electric resistance of the olivine-type phosphate compound enlarges. Moreover, when the carbon content exceeds 10% by weight, a discharged capacity per unit weight of the olivine-type phosphate compound becomes small.

In a method set forth in Japanese Unexamined Patent Publication (KOKAI) Gazette No. 2014-179176, a reaction solution, in which an $LiFePO_4$ raw-material solution comprising an Li source, an Fe source and a $PO_4$ source, and an oxidized graphene/water dispersion liquid serving as a carbon source are mixed in a solvent including water in an amount of 50% by mass or more, undergoes a hydrothermal reaction by heating the reaction solution within a pressure-resistant container under such conditions as a temperature is from 150 to 400° C. and a pressure is from to 40 MPa. Thus, a phosphate/carbon composite is obtainable. Note that the phosphate/carbon composite is an electrode material in which an olivine-type $LiFePO_4$ of which the average particle diameter is from 5 to 50 nm is disposed on thin film-shaped graphite particles obtained by reducing the oxidized graphene of which the average particle diameter is 100 nm or more and the average thickness is from 0.4 nm to 10 nm; and the phosphate/carbon composite contains the graphite particles in an amount of from 0.01 to one part by mass with respect to the $LiFePO_4$ in an amount of 100 parts by mass.

In a method set forth in Japanese Unexamined Patent Publication (KOKAI) Gazette No. 2014-029863, the following are carried out: a step of producing a mixture in which an unfunctionalized fibrous carbon material (such as a carbon nanotube, for instance), a surface-functionalized carbon material and olivine-type phosphate-compound particles are dispersed, and in which a weight of the surface-functionalized fibrous carbon is larger than a weight of the unfunctionalized fibrous carbon material; and a step of granulating the mixture by drying. Thus, a phosphate/carbon composite is obtainable. Note that the phosphate/carbon composite contains an agglomerate of the primary particles of the olivine-type phosphate compound, and the fibrous carbon materials; and the phosphate/carbon composite includes the fibrous carbon materials which exist more densely in the superficial portion of the agglomerate than in the interior of the agglomerate.

International Publication No. 2013/018758 discloses that a carbon source, such as sucrose, is added to $LiFePO_4$, one of the kinds of olivine-type phosphate compound, to coat a surface of the $LiFePO_4$ with carbon.

A method set forth in Japanese Unexamined Patent Publication (KOKAI) Gazette No. 2012-216473 includes a calcination step of mixing $LiFePO_4$ particles with a carbon precursor forming a conductive carbon-coated layer by thermal decomposition and then calcining the mixture at a temperature and in an atmosphere where a thermal decomposition of the carbon precursor progresses. Moreover, a mixing step is carried out to mix the carbon precursor, which includes an aromatic compound with a molecular weight of 160 or more in an amount of from 20 to 99% by weight, and of which the viscosity is from 500 to 1,000 mPa-sec at 20° C., with the $LiFePO_4$ particles. In addition, the mixture obtained at the mixing step is subjected to the calcination step. The calcination step is carried out in a calcination furnace put in the atmosphere of an inert gas (such as a nitrogen gas) by raising the in-furnace temperature up to between 550 and 750° C. Thus, a thick-layer portion with a thickness of 2 nm or more, and a thin-layer portion with a thickness of less than 2 nm are formed on a surface of the $LiFePO_4$ particles, so that a phosphate/carbon composite, which exhibits good electron conductivity with a less carbon amount, is obtainable.

"Lithium-ion Secondary Battery" written by WATANABE Haruo discloses a variety of methods for carbon coating on pp. 278 through 280.

When a summed mass of the lithium metallic oxide and phosphate/carbon composite in a positive-electrode active-material layer is taken as 100% by mass, a content of the phosphate/carbon composite is from 15% by mass or more to 35% by mass or less. Moreover, the content is preferably from 15% by mass or more to 30% by mass or less, or especially preferably from 15% by mass or more to 25% by mass or less. When the content of the phosphate/carbon composite is too much, the content of the lithium metallic oxide reduces relatively, so that such a fear arises as a battery capacity declines. When the content of the phosphate/carbon composite is too less, the content of the lithium metallic oxide is too great relatively, so that such another fear arises as the thermal stability of positive electrode declines.

A positive electrode for lithium-ion secondary battery according to the present embodiment comprises a current collector, and a positive-electrode active-material layer coating the surface of the current collector. The positive-electrode active-material layer includes a positive-electrode active material made up of the above-mentioned lithium metallic oxide and phosphate/carbon composite.

When the entire positive-electrode active-material layer is taken as 100% by mass, a compounding ratio of the positive-electrode active material made up of the above-mentioned lithium metallic oxide and phosphate/carbon composite falls preferably within a range of from 50 to 99% by mass, more preferably within a range of from 60 to 98% by mass, or especially preferably within a range of from 70 to 97%.

In the present embodiment, the positive-electrode active-material layer further includes the following additives sometimes, in addition to the above-mentioned positive-electrode active material.

As for the additives, conductive additives, binding agents, or dispersion agents, and the like, are givable.

A conductive additive is added in order to enhance the electric conductivity of electrode. Consequently, adding the conductive additive arbitrarily is allowed when an electrode runs short of the electric conductivity, but not adding the conductive additive is even permitted when an electrode excels in the electric conductivity sufficiently. When a conductive additive is added to the positive electrode, a current becomes likely to flow in both the lithium metallic oxide and phosphate/carbon composite. Accordingly, an excessive current becomes likely to flow also in the lithium metallic oxide with poor or inferior thermal stability at the time of short-circuiting.

However, even in such a case, the excessive current is inhibited from being supplied to the lithium metallic oxide because the volume resistivity of the phosphate/carbon composite is lower than the volume resistivity of the lithium metallic oxide so that the excessive current arising at the time of short-circuiting flows to the phosphate/carbon composite of which the thermal stability is good. Hence, the positive electrode according to the present embodiment is excellent in the thermal stability even when a conductive additive is included therein.

As for the conductive additive, being a chemically-inactive high-electron conductor is allowed, and the following are exemplified: carbonaceous fine particles, such as carbon black, graphite, acetylene black and KETJENBLACK (registered trademark); gas-phase-method carbon fibers (or vapor-grown carbon fibers (or VGCF)); or a various types of metallic particles; and the like. One of the conductive additives is addable independently, or two or more thereof are combinable to add to the positive-electrode active-material layer.

The conductive additive is not at all restricted especially as to the configuration. However, in view of the roles, the smaller average particle diameter the conductive additive has, the more preferable the conductive additive is. When giving a preferable average particle diameter, being 10 µm or less is allowed, or falling within a range of from 0.01 to 1 µm is more preferable.

A compounding amount of the conductive additive is not at all restricted especially. When giving a compounding amount of the conductive additive in the positive-electrode active-material layer daringly, falling within a range of from 0.5 to 10% by mass is allowed, falling within a range of from 1 to 7% by mass is preferable, or falling within a range of from 2 to 5% by mass is especially preferable.

The binding agent performs a role of fastening the positive-electrode active material and conductive additive together onto the surface of a current collector. As for the binding agent, the following are exemplifiable: fluorine-containing resins, such as polyvinylidene fluoride, polytetrafluoroethylene and fluorinated rubber; thermoplastic resins, such as polypropylene and polyethylene; imide-based resins, such as polyimide and polyamide-imide; and alkoxysilyl group-containing resins. Moreover, as the binding agent, adopting a polymer having hydrophilic group is also allowed. As for a hydrophilic group of the polymer having hydrophilic group, the following are exemplified: a carboxyl group, a sulfo group, a silanol group, an amino group, a hydroxyl group, or a phosphate group. As a specific example of the polymer having hydrophilic group, the following are exemplifiable: polyacrylate, carboxymethyl cellulose, polymethacrylate, or poly(p-styrene sulfonate).

A compounding amount of the binding agent is not at all restricted especially. However, when giving the compounding amount of the binding agent in the positive-electrode active-material layer daringly, falling within a range of from 0.5 to 10% by mass is preferable, falling within a range of from 1 to 7% by mass is more preferable, or falling within a range of from 2 to 5% by mass is especially preferable. The compounding amount of the binding agent being too less leads to causing such a fear as the positive-electrode active-material layer declines in the formability. Moreover, the compounding amount of the binding agent being too much is not preferable because the amount of the positive-electrode active material in the positive-electrode active-material layer decreases relatively.

For additives (such as the dispersion agent) other than the conductive additive and binding agent, adopting the conventional additives is possible.

A "current collector" refers to a chemically-inactive high-electron conductor for keeping an electric current flowing to electrodes during the discharging or charging operations of a lithium-ion secondary battery. As for the current collector, the following are exemplifiable: at least one member selected from the group consisting of silver, copper, gold, aluminum, magnesium, tungsten, cobalt, zinc, nickel, iron, platinum, tin, indium, titanium, ruthenium, tantalum, chromium, and molybdenum; as well as metallic materials, such as stainless steels. Covering or coating the current collector with a publicly-known protective layer is also allowed.

The current collector is capable of taking such a form as a foil, a sheet, a film, a linear shape, or a rod-like shape. Consequently, as the current collector, a metallic foil, such as a copper foil, a nickel foil, an aluminum foil or a stainless-steel foil, is usable suitably. When the current collector has a foiled, sheeted or filmed form, a preferable thickness thereof falls within a range of from 10 µm to 100 µm.

Production Process for Positive Electrode for Lithium-ion Secondary Battery

A process for producing the above-mentioned positive electrode for lithium-ion secondary battery comprises a confirmation step confirming whether a rate of a volume resistivity of the phosphate/carbon composite with respect to a volume resistivity of the lithium metallic oxide (i.e., "LP"/"LO" volume-resistance ratio) is 0.034 or less.

In order to confirm that the "LP"/"LO" volume-resistance ratio is 0.034 or less, a volume resistivity of the lithium metallic oxide, and a volume resistivity of the phosphate/carbon composite are measured. For example, carrying out a method set forth in one of the following embodiments makes the measurement of the volume resistivities possible.

When the "LP"/"LO" volume-resistance ratio is not 0.034 or less at the aforementioned confirmation step, the volume resistivity of the lithium metallic oxide, and the volume resistivity of the phosphate/carbon composite are adjusted so as to make the "LP"/"LO" volume-resistance ratio 0.034 or less.

Thereafter, the following steps, namely, steps a), b) and c) are carried out.

At step a), the lithium metallic oxide, the phosphate/carbon composite, an additive, and a solvent are mixed each other to produce a dispersion liquid.

As for the solvent, the following are exemplifiable specifically: N-methyl-2-pyrrolidone (hereinafter, abbreviated to sometimes as "NMP"), dimethylformamide dimethylacetamide, methanol, acetone, methyl ethyl ketone, methyl isobutyl ketone, cyclohexanone, methyl acetate, ethyl acetate, and tetrahydrofuran. One member of the solvents are also allowed to be used independently, or two or more members of the solvents are even permitted to be combined to use. The dispersion liquid at step a) comprises the solvent, and solid contents other than the solvent. The "solid contents other than the solvent" refers to the lithium metallic oxide, and the phosphate/carbon composite, as well as additives (such as the binding agent, conductive additive and dispersing agent) used, if needed. In the dispersion liquid at step a), a compounding amount of the solid contents other than the solvent preferably falls within a range of from 30 to 90% by mass, more preferably within a range of from 50 to 80% by mass, or especially preferably within a range of from 60 to 70% by mass.

At step b), a positive-electrode active-material layer is formed by applying the dispersion liquid produced at step a) onto a current collector, and then by removing the solvent included in the dispersion liquid.

As for a specific method for applying the dispersion liquid onto a current collector, the following heretofore publicly-known methods are givable: a roll-coating method, a dip-coating method, a doctor-blade method, a spray-coating method, or a curtain-coating method, and the like.

Moreover, as for a specific method for removing the solvent included in the dispersion liquid, such a method is givable as carrying out drying the dispersion liquid under a warmed condition and/or depressurized condition, so that the solvent included in the dispersion liquid is removed as gases.

At step c), the positive-electrode active-material layer obtained at step b) is compressed by a compression apparatus. As for the compression apparatus, adopting one of heretofore publicly-known compression apparatuses is allowed.

Note that the production process according to the present invention is preferably carried out in an inert-gas atmosphere.

Lithium-ion Secondary Battery

Adopting the positive electrode for lithium-ion secondary battery according to the present invention makes lithium-ion secondary batteries manufacturable. A lithium-ion secondary battery comprises a positive electrode, a negative electrode, a separator, and an electrolytic solution, as the battery constituent elements.

The negative electrode comprises a current collector, and a negative-electrode active-material layer bound together onto a surface of the current collector. The negative-electrode active-material layer includes a negative-electrode active material, as well as a binding agent and/or a conductive additive, if needed. For the current collector, binding agent and conductive additive, adopting the current collector, binding agent and conductive additive explained in the positive electrode is allowed. Moreover, as the binding agent for the negative-electrode active-material layer, adopting styrene-butadiene rubber is also permitted.

As for the negative-electrode active material, the following are exemplifiable: carbon-based materials being capable of occluding and releasing (or sorbing and desorbing) lithium; elements being capable of alloying with lithium; compounds comprising an element being capable of alloying with lithium; or polymeric materials.

As for the carbon-based material, the following are exemplifiable: non-graphitizable carbon, natural graphite, artificial graphite, cokes, graphites, glassy carbons, organic-polymer-compound calcined bodies, carbon fibers, activated carbon, or carbon blacks. Note herein that the "organic-polymer-compound calcined bodies" refer to calcined bodies carbonized by calcining polymeric materials, such as phenols and furans, at a proper temperature. As for the polymeric material, poyacetylene, or polypyrrole is exemplifiable specifically.

As for the element being capable of alloying with lithium, the following are exemplifiable specifically: Na, K, Rb, Cs, Fr, Be, Mg, Ca, Sr, Ba, Ra, Ti, Ag, Zn, Cd, Al, Ga, In, Si, Ge, Sn, Pb, Sb, and Bi. In particular, Si, or Sn is preferred.

As for the compound comprising an element being capable of alloying with lithium, the following are exemplifiable specifically: ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (where $0<"v"\leq 2$), $SnO_w$ (where $0<"w"\leq 2$), $SnSiO_3$, LiSiO, or LiSnO. In particular, $SiO_x$ (where $0.3\leq"x"\leq 1.6$) is preferred. Moreover, as the compound comprising an element capable of undergoing an alloying reaction with lithium, tin compounds, such as tin alloys (e.g., Cu—Sn alloys, or Co—Sn alloys, and the like), are exemplifiable.

A silicon oxide made up of the above-mentioned $SiO_v$ (where $0<"v"\leq 2$) is obtainable by disproportionating SiO, an amorphous silicon oxide which is obtainable using silicon dioxide ($SiO_2$) and simple-substance silicon (Si) as raw materials, by a heat treatment, and so forth. A "disproportionation reaction" is a reaction in which SiO decomposes into an Si phase, and an $SiO_2$ phase. In general, when being put under such a condition that oxygen is cut off, almost all of SiO has been said to disproportionate to separate into the two phases at 800° C. or more. To be concrete, a silicon-oxide powder, which includes the two phases, namely, a noncrystalline $SiO_2$ phase and a crystalline Si phase, is obtainable by subjecting a noncrystalline SiO powder to a heat treatment carried out at from 800 to 1,200° C. for from one to five hours in an inert atmosphere, such as in a vacuum or in an inert gas.

An average particle diameter of the silicon-oxide powder is preferably 4 μm or more. The "average particle diameter" is a median diameter, and is obtainable based on a volumetric-basis grain-size distribution resulting from a laser diffractometry. The average particle diameter of the silicon-oxide powder is more preferably 20 μm or less, or much more preferably 15 μm or less. When the average particle diameter is too small, the generation of "SEI" (i.e., solid electrolyte interphase) is so great that such a case arises as cyclic characteristics decline, because the silicon-oxide powder has many active sites. Meanwhile, when the average particle diameter is too large, the electric conductivity of an entire electrode becomes inhomogeneous, so that such another case arises as the rise in resistance or the decline in output takes place, because the silicon-oxide powder has a poor electric conductivity.

Moreover, International Publication No. 2014/080608 reports a silicon material serving as a negative-electrode active material. The silicon material is produced as follows: a lamellar silicon compound, of which the major component is a lamellar polysilane from which Ca has been removed, is synthesized by reacting $CaSi_2$ with an acid; and then hydrogen is broken away from the lamellar polysilicon compound by heating the lamellar polysilane compound at 300° C. or more.

$CaSi_2$ is generally made up of a structure in which a Ca layer and an Si layer are laminated. Synthesizing $CaSi_2$ by a publicly-known production method is also allowed, or adopting commercially available $CaSi_2$ is even permitted. $CaSi_2$ to be used in a production process for the lamellar silicon compound is preferably pulverized in advance. Moreover, CaSi$_2$ to be employed in the present invention includes crystalline silicon as an impurity.

As for the acid, the following are exemplified: hydrogen fluoride, hydrogen chloride, hydrogen bromide, hydrogen iodide, sulfuric acid, nitric acid, phosphoric acid, formic acid, acetic acid, methanesulphonic acid, tetrafluoroboric acid, hexaflurophosphoric acid, hexafluoroarsenic acid, fluoroantimonic acid, hexafluorosilicic acid, hexafluorogermanic acid, hexafluorstannic(IV) acid, trifluoroacetic acid, hexafluorotitanic acid, hexafluorozirconic acid, trifluoromethane sulfonic acid, and fluorosulfonic acid. Employing one of the acids independently, or employing a few of the acids combindely, is allowable.

Moreover, using the acid as an aqueous solution is preferable from the viewpoint of operational simplicity and safeness, as well as from the viewpoint of removing side products.

The acid to be used for a reaction step is used allowably in an amount being capable of supplying to CaSi$_2$ two equivalents or more of protons. Therefore, when being a monovalent acid, the acid is used permissively in an amount of two moles or more to 1-mole CaSi$_2$.

A reaction condition for the reaction step is set preferably under a depressurized condition, such as in a vacuum, or under an inert-gas-atmosphere condition. Moreover, the other reaction conditions are also set preferably under a temperature condition of room temperature or less, such as in an ice bath. Setting up a reaction time appropriately for the step is allowed.

Incidentally, a case where hydrogen chloride is used as the acid at the reaction step is expressed with a reaction equation, the reaction equation is as set forth below.

$$3CaSi_2 + 6HCl \longrightarrow Si_6H_6 + 3CaCl_2$$

The Si$_6$H$_6$, a polysilane, corresponds to an ideal lamellar silicon compound. Believing is also possible that, in the reaction, Si—H bonds are formed while 2Hs, namely, two hydrogens, substitute for Ca in lamellar CaSi$_2$. The lamellar silicon compound is made lamellarly, because the basic skeleton of Si layers in the raw-material CaSi$_2$ is maintained.

As described above, using the acid as an aqueous solution is preferable at the reaction step. Note herein that, since Si$_6$H$_6$ is capable of reacting with water, the lamellar silicon compound is hardly obtainable usually as such a compound alone as Si$_6$H$_6$, but the lamellar silicon compound contains oxygen or elements derived from the acid.

Moreover, also allowable is making a silicon material by heating the lamellar silicon compound to break away hydrogen, and the like, from the lamellar silicon compound.

A production process for the silicon material comprises a step (hereinafter, being sometimes referred to as a "silicon-material production step") of heating the lamellar silicon compound at 300° C. or more.

When the silicon-material production step is expressed with an ideal reaction equation, the step is as set forth below.

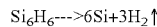
$$Si_6H_6 \longrightarrow 6Si + 3H_2 \uparrow$$

However, since the lamellar silicon compound used actually for the silicon-material production step contains oxygen or elements derived from the acid, and further contains inevitable impurities as well, the silicon material obtainable actually, too, turns into a material which contains oxygen or elements derived from the acid, and which further contains inevitable impurities as well. In the silicon material, a molar amount of the oxygen element is preferably 50 or less, or the amount makes especially preferably 40 or less, when a molar amount of the silicon element is taken as 100. Moreover, a molar amount of elements derived from the acid is preferably 8 or less, or the amount makes especially preferably 5 or less, when a molar amount of the silicon element is taken as 100.

The silicon-material production step is carried out preferably in a nonoxidizing atmosphere of which the oxygen content is less than the oxygen content in an ordinary air atmosphere. As for the nonoxidizing atmosphere, reduced-pressure atmospheres including vacuums, and inert-gas atmospheres are exemplifiable. A preferable heating temperature falls within a range of from 350° C. to 1,200° C., or a more preferable heating temperature falls within a range of from 400° C. to 1,200° C. When the heating temperature is too low, such a case arises as hydrogen does not breakaway sufficiently; whereas the heating temperature being too high leads to the waste of energy. Setting up a heating time appropriately in compliance with the heating temperature is allowed. Moreover, while measuring an amount of hydrogen and the other elements getting out from a reaction system to the outside, determining the heating time is also preferred. Selecting the heating temperature and heating time appropriately makes also possible adjusting proportions of amorphous silicon and silicon crystallites included in the silicon material to be produced, and makes also possible adjusting sizes of the silicon crystallites. In addition, appropriately selecting the temperature and time makes possible even adjusting configurations and sizes of nanometer-level-thickness layers including the amorphous silicon and silicon crystallites included in the silicon material to be produced.

As for a size of the silicon crystallites, the silicon crystallites having nanometer sizes are preferable. To be concrete, the size of the silicon crystallites falls preferably within a range of from 0.5 nm to 300 nm, more preferably within a range of from 1 nm to 100 nm, much more preferably within a range of from 1 nm to 50 nm, or especially preferably within a range of from 1 nm to 10 nm. Note that the size of the silicon crystallites is computed by the Scherrer equation using the half-value width of a diffraction peak of Si (111) plane in an XRD chart which is obtained by carrying out an X-ray diffraction measurement (or XRD measurement) to the silicon material.

The aforementioned silicon-material production step makes obtainable the silicon material comprising a structure in which plate-shaped silicon bodies are laminated in a plurality of pieces in the thickness direction. The structure is ascertainable by observation with a scanning-type electron microscope, and the like. When employing the silicon material as an active material for lithium-ion secondary battery is taken into consideration, the silicon bodies preferably have a thickness falling within a range of from 10 nm to 100 nm, or more preferably have a thickness falling within a range of from 20 nm to 50 nm, in order for efficient insertion and elimination (or sorption and desorption) reactions of the lithium ions. Moreover, the plate-shaped silicon bodies preferably have a major-axis-direction length falling within a range of from 0.1 μm to 50 μm. In addition, the plate-shaped silicon bodies preferably exhibit a ratio, (Major-axis-direction Length)/(Thickness), falling within a range of from 2 to 1,000.

Turning the silicon material into particles having a constant grain size distribution via pulverization or classification is also allowed. As for a preferable grain size distribution, exemplifiable are grain size distributions of which D$_{50}$ falls within a range of from 1 to 30 μm when measured by a common laser-diffraction type grain-size-distribution measuring apparatus.

The silicon material is employable as a negative-electrode active material for secondary batteries, such as lithium-ion secondary batteries. On the occasion, the silicon material is preferably covered or coated with carbon to use.

The separator is a constituent element which isolates the positive electrode and negative electrode from one another, but which lets lithium ions pass therethrough while preventing the two electrodes from contacting with one another to result in short-circuiting. As for the separator, the following are exemplifiable, for instance: porous films using one member or multiple members of synthetic resins, such as polytetrafluoroethylene, polypropylene or polyethylene; or porous films made of ceramics.

The electrolytic solution includes a nonaqueous solvent, and an electrolyte dissolved in the nonaqueous solvent.

As for the nonaqueous solvent, cyclic esters, linear or chain-shaped esters, ethers, and the like, are employable. As for the cyclic esters, the following are exemplifiable: ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. As for the linear esters, the following are exemplifiable: dimethyl carbonate, diethyl carbonate, dibutyl carbonate, dipropyl carbonate, ethyl methyl carbonate, alkyl propionate ester, dialkyl malonate ester, alkyl acetate ester, and so forth. As for the ethers, the following are exemplifiable: tetrahydrofuran, 2-methyltetrahydrofuran, 1,4-dioxane, 1,2-dimethoxyethane, 1,2-diethoxyethane, and 1,2-dibutoxyethane. For the electrolytic solution, using one of the nonaqueous solvents independently is also allowed, or using a plurality of the nonaqueous solvents combinedly is even permitted.

As for the electrolyte, a lithium salt, such as $LiClO_4$, $LiAsF_6$, $LiPF_6$, $LiBF_4$, $LiCF_3SO_3$ or $LiN(CF_3SO_2)_2$, is exemplifiable.

As for the electrolytic solution, the following solution is exemplifiable: a solution comprising a lithium salt, such as $LiClO_4$, $LiPF_6$, $LiBF_4$ or $LiCF_3SO_3$, dissolved in a concentration of from 0.5 mol/L to 1.7 mol/L approximately in a nonaqueous solvent, such as ethylene carbonate, dimethyl carbonate, propylene carbonate or diethyl carbonate.

In order to manufacture a lithium-ion secondary battery, the positive electrode and negative electrode are turned into a polar-plate subassembly by setting or inserting the separator between the positive electrode and the negative electrode, for instance. Making the polar-plate subassembly into any of the following types is allowed: a laminated type in which the positive electrode, the separator and the negative electrode are superimposed; or a rolled-around type in which the positive electrode, the separator and the negative electrode are rolled around. After connecting intervals from the positive-electrode current collectors and negative-electrode current collectors up to the positive-electrode terminals and negative-electrode terminals, which lead to the outside, with leads, and the like, for collecting electricity, providing the polar-plate subassembly with the electrolytic solution to complete a lithium-ion secondary battery is permitted.

The lithium-ion secondary battery is moutable on-board in a vehicle. A vehicle having the lithium-ion secondary battery on-board makes a high-performance vehicle, because the lithium-ion secondary battery maintains large charged and discharged capacities, and exhibits excellent cyclabilities.

As for the vehicle, an allowable vehicle is a vehicle making use of electric energies produced by battery for all or some of the power source. For example, the following are given: electric automobiles, hybrid automobiles, plug-in hybrid automobiles, hybrid railroad vehicles, electric-powered forklifts, electric wheelchairs, electric-power-assisted bicycles, and electric-powered two-wheel vehicles.

Having been explained so far are the embodiment modes of the present invention. However, the present invention is not limited to the aforementioned embodying modes at all. The present invention is feasible in various modes, to which changes or modifications that one of ordinary skill in the art carries out are made, within a range not departing from the gist of the present invention.

EXAMPLES

Hereinafter, various batteries were fabricated, and were subjected to tests. Batteries 1, 3, 4, 6, 8, 11 through 14, 17, and 19 through 23 correspond to examples according to the present invention, and batteries 2, 5, 7, 9, 10, 15, 16 and 18 correspond to reference examples according to the present invention. Note that the present invention is not at all limited by the examples and reference examples. In the following descriptions, the term, "part," means a part by mass, and the term, "%," means a percentage by mass, unless otherwise specified especially.

Readying Positive-electrode Active Material

As a lithium metallic oxide, the following were made ready: $LiNi_{5/10}Co_{3/10}Mn_{2/10}O_2$ with a 5-μm average particle diameter; $LiNi_{5/10}Co_{2/10}Mn_{3/10}O_2$ with a 5-μm average particle diameter; and $LiNi_{1/3}Co_{1/3}Mn_{3/1}O_2$ with a 5-μm average particle diameter. The $LiNi_{5/10}Co_{3/10}Mn_{2/10}O_2$, $LiNi_{5/10}Co_{2/10}Mn_{3/10}O_2$, and $LiNi_{1/3}Co_{1/3}Mn_{3/1}O_2$ were labeled "NCM-1," "NCM-2," and "NCM-3," respectively.

As a phosphate/carbon composite, eight types of $LiFePO_4$ of which the surface was coated with carbon were made ready. The respective phosphate/carbon composites were fabricated by a publicly-known method. The eight types of the phosphate/carbon composites had an average particle diameter of from 0.4 to 25 μm. The eight types of the phosphate/carbon composites were labeled "LFP-1," "LFP-2," "LFP-3," "LFP-4," "LFP-5," "LFP-6," "LFP-7," and "LFP-8," in turn. The eight types of the phosphate/carbon composites had a carbon coating amount of from one to 3.5% by mass. Among the eight phosphate/carbon composites, "LFP-1" had a carbon coating amount of 2% by mass, and "LFP-5" had a carbon coating amount of 1.6% by mass.

Volume resistivities of the above-mentioned lithium metallic oxides and phosphate/carbon composites were measured. In order to measure the volume resistivities of the respective components, each of the components were put in an amount of 2 g in a cylindrical tube with a 2-cm diameter. Each of the components was compressed by a 20-kN load. A resistance measuring apparatus (e.g., "MCP-PD51 (the product name)," which was produced by MITSUBISHI CHEMICAL ANALYTECH Co., Ltd.) was used to find the volume resistivity of each of the components. Measured results are shown in Table 1.

Battery 1

Fabricating Positive Electrode 1

Confirmation Step

"NCM-2" was used as a lithium metallic oxide. "LFP-1" was used as a phosphate/carbon composite. A rate (or an "LP"/"LO" volume-resistance ratio) of the volume resistivity of "LFP-1" with respect to the volume resistivity of "NCM-2" was 0.0085.

Step a

Using a planetary type stirring/defoaming apparatus, the following were mixed to make a dispersion liquid: 71-part "NCM-2" serving as a lithium metallic oxide; 23-part "LFP-1" serving as a phosphate/carbon composite; 3-part acetylene black having from 0.05 to 0.1-μm average particle diameter and serving as a conductive additive; 3-part polyvinylidene fluoride serving as a binding agent; and NMP serving as a solvent in a total amount of about 54 parts.

Note herein that a content of the lithium metallic oxide was 76%, and a content of the phosphate/carbon composite was 24%, when a summed mass of the lithium metallic oxide and phosphate/carbon composite was taken as 100%.

Step b

An aluminum foil with a thickness of 20 μm was made ready as a current collector. The dispersion liquid produced at step a) was put on a surface of the aluminum foil, and was then applied thereto so that the dispersion liquid made a film shape, using a doctor blade. The aluminum foil with the dispersion liquid applied thereon was dried at 80° C. for 20 minutes. Thus, the NMP was removed by volatilization, so that a positive-electrode active-material layer was formed on the surface of the aluminum foil.

Step c

As a compressing apparatus, a roll pressing machine manufactured by OHNO ROLL Co., Ltd. was used. The aluminum foil, which underwent step b) to be provided with the positive-electrode active-material layer, was arranged on the compressing apparatus. The compressing apparatus was started to compress the positive-electrode active-material layer. An obtained positive electrode was dried at 120° C. for six hours by a vacuum drier, was thereafter cut out to a predetermined configuration (e.g., a 40-mm×80-mm rectangular shape), and was then labeled Positive Electrode 1.

Fabricating Negative Electrode 1

Negative Electrode 1 was fabricated in the following manner.

As a negative-electrode active material, SiO (where 0.3≤"x"≤1.6), and natural graphite were used. The $SiO_x$ (where 0.3≤"x"≤1.6) was an ingredient obtained by carrying out a disproportionation reaction to SiO. As a binding agent, poyimide and poyamide-imde were used. As a conductive additive, acetylene black was used. The ingredients were mixed with each other so that a ratio, the $SiO_x$ (where 0.3≤"x"≤1.6):the natural graphite:the acetylene black:the polyamide-imide, made 32:50:8:10 by mass ratio. Then, NMP was added to the mixture, so that a slurry-like negative-electrode mixed-material preparation liquid was obtained. The negative-electrode mixed-material preparation liquid was applied onto a surface of a copper foil having a thickness of 20 μm and serving as a negative-electrode current collector. Subsequently, the copper film with the preparation liquid applied thereon underwent the drying at step b), and step c) in the same manner as the above-mentioned positive electrode. Thus, Negative Electrode 1 was obtained.

Fabricating Lithium-ion Secondary Battery

Using above-mentioned Positive Electrode 1 and Negative Electrode 1, a laminated-type lithium-ion secondary battery was fabricated as described below.

Between the positive electrode and the negative electrode, a rectangle-shaped sheet, of which the size was 50×90 mm and the thickness was 25 μm and which was made up of a resinous film having a polypropylene/polyethylene/polypropylene three-layered construction, was interposed or held to make a polar-plate subassembly. After covering the polar-plate subassembly with laminated films in which two pieces made a pair and then sealing the laminated films at the three sides, an electrolytic solution was injected into the laminated films which had been turned into a bag shape. As for the electrolytic solution, a solution was used: the solution comprised a solvent in which ethylene carbonate, methyl ethyl carbonate, and dimethyl carbonate had been mixed with each other in such a volumetric ratio as 3:3:4; and $LiPF_6$ dissolved in the solvent so as to make 1 mol/L. Thereafter, the remaining one side was sealed to obtain a laminated-type lithium-ion secondary battery in which the four sides were sealed air-tightly and in which the polar-plate subassembly and electrolytic solution were closed hermetically. Note that the positive electrode and negative electrode were equipped with a tab connectable electrically with the outside, respectively, and the tabs extended out partially to the outside of the laminated-type lithium-ion secondary battery. The obtained lithium-ion secondary battery was labeled Battery 1.

Battery 2

Other than using "LFP-8" as a phosphate/carbon composite, Positive Electrode 2 used in Battery 2 was the same as Positive Electrode 1. A rate of the volume resistivity of "LFP-8" with respect to the volume resistivity of "NCM-2" was 8.3838. Using Positive Electrode 2, a lithium-ion secondary battery was manufactured in the same manner as Battery 1. The obtained lithium-ion secondary battery was labeled Battery 2.

Battery 3

Other than using "LFP-4" as a phosphate/carbon composite, Positive Electrode 3 used in Battery 3 was the same as Positive Electrode 1. A rate of the volume resistivity of "LFP-4" with respect to the volume resistivity of "NCM-2" was 0.0240. Using Positive Electrode 3, a lithium-ion secondary battery was manufactured in the same manner as Battery 1. The obtained lithium-ion secondary battery was labeled Battery 3.

Battery 4

Other than using "LFP-5" as a phosphate/carbon composite, Positive Electrode 4 used in Battery 4 was the same as Positive Electrode 1. A rate of the volume resistivity of "LFP-5" with respect to the volume resistivity of "NCM-2" was 0.0315. Using Positive Electrode 4, a lithium-ion secondary battery was manufactured in the same manner as Battery 1. The obtained lithium-ion secondary battery was labeled Battery 4.

Battery 5

Other than using "LFP-6" as a phosphate/carbon composite, Positive Electrode 5 used in Battery 5 was the same as Positive Electrode 1. A rate of the volume resistivity of "LFP-6" with respect to the volume resistivity of "NCM-2" was 0.4893. Using Positive Electrode 5, a lithium-ion secondary battery was manufactured in the same manner as Battery 1. The obtained lithium-ion secondary battery was labeled Battery 5.

Battery 6

Other than using "LFP-2" as a phosphate/carbon composite, Positive Electrode 6 used in Battery 6 was the same as Positive Electrode 1. A rate of the volume resistivity of "LFP-2" with respect to the volume resistivity of "NCM-2" was 0.0110. Using Positive Electrode 6, a lithium-ion secondary battery was manufactured in the same manner as Battery 1. The obtained lithium-ion secondary battery was labeled Battery 6.

Battery 7

Other than using "LFP-7" as a phosphate/carbon composite, Positive Electrode 7 used in Battery 7 was the same as Positive Electrode 1. A rate of the volume resistivity of "LFP-7" with respect to the volume resistivity of "NCM-2" was 0.5438. Using Positive Electrode 7, a lithium-ion secondary battery was manufactured in the same manner as Battery 1. The obtained lithium-ion secondary battery was labeled Battery 7.

Battery 8

Other than using "LFP-3" as a phosphate/carbon composite, Positive Electrode 8 used in Battery 8 was the same as Positive Electrode 1. A rate of the volume resistivity of "LFP-3" with respect to the volume resistivity of "NCM-2" was 0.0220. Using Positive Electrode 8, a lithium-ion secondary battery was manufactured in the same manner as Battery 1. The obtained lithium-ion secondary battery was labeled Battery 8.

Battery 9

Other than using "NCM-1" as a lithium metallic oxide and "LFP-2" as a phosphate/carbon composite, Positive Electrode 9 used in Battery 9 was the same as Positive Electrode 1. A rate of the volume resistivity of "LFP-2" with respect to the volume resistivity of "NCM-1" was 0.0430. Using Positive Electrode 9, a lithium-ion secondary battery was manufactured in the same manner as Battery 1. The obtained lithium-ion secondary battery was labeled Battery 9.

Battery 10

Other than using "NCM-1" as a lithium metallic oxide and "LFP-3" as a phosphate/carbon composite, Positive Electrode 10 used in Battery 10 was the same as Positive Electrode 1. A rate of the volume resistivity of "LFP-3" with respect to the volume resistivity of "NCM-1" was 0.0860.

Using Positive Electrode 10, a lithium-ion secondary battery was manufactured in the same manner as Battery 1. The obtained lithium-ion secondary battery was labeled Battery 10.

Nail Penetration Test 1

To Batteries 1 through 10 fabricated variously as above, a nail penetration test was carried out to measure the battery surface temperatures at the time of short-circuiting internally.

To each of the batteries, a constant-voltage charging operation was carried out until the batteries stabilized at a potential of 4.5 V. The post-charging batteries (of which the discharged capacity was estimated to be 4 Ah approximately) were arranged on a constriction plate having pores with a diameter of 20 mm. A pressing machine, to which nails were installed at the top, was arranged over the constriction plate. The nails were moved from up above to down below at a rate of 20 mm/sec until the nails penetrated through the batteries disposed on the constriction plate and then the leading end of the nails was located inside the pores in the constriction plate. The surface temperatures of the post-nail-penetration batteries were measured. Table 1 sets forth the maximum temperatures among the thus observed surface temperatures. Note that the employed nails had a configuration of which the diameter was 8 mm and the leading-end or tip angle was 60 degrees, and were made of S45C, a material quality prescribed in JIS G 4051.

Figure 2:
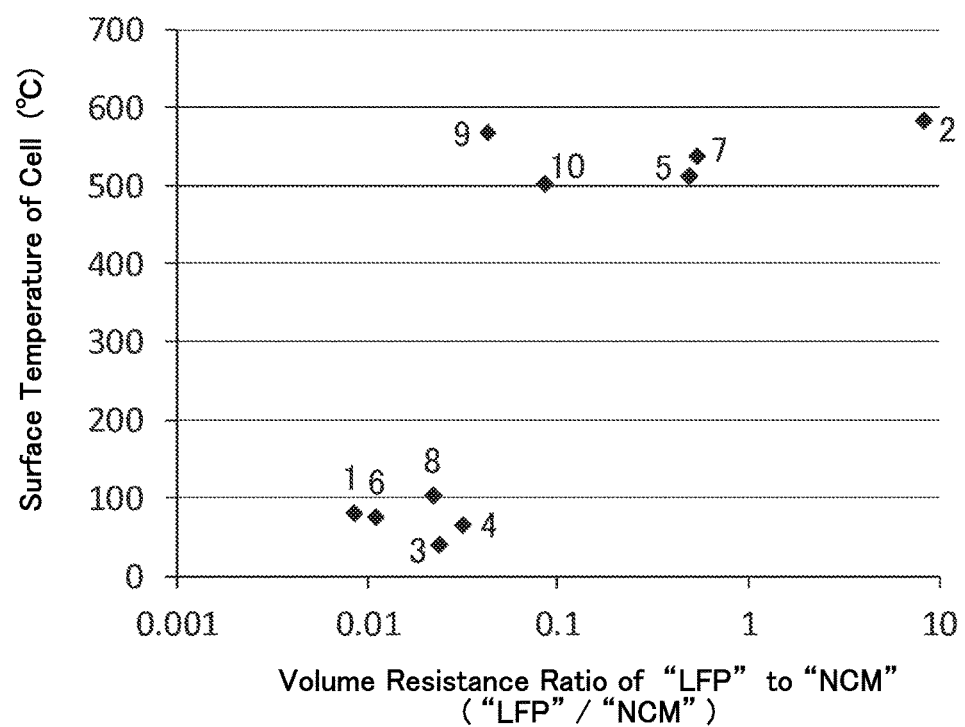
FIG. 2 is a diagram showing relationships between "LP"/"LO" volume-resistance ratios and battery surface temperatures in Batteries 1 through 10.

FIG. 2 shows the "LP"/"LO" volume-resistance ratios of the various positive electrodes, and the battery surface temperatures.

As shown in FIG. 2 and Table 2, the battery surface temperature was as low as 150° C. or less when the "LP"/"LO" volume-resistance ratio was 0.0315 or less. In contrast thereto, the battery surface temperature became as remarkably high as 400° C. or more when the "LP"/"LO" volume-resistance ratio was 0.0430 or more. From the facts, the thermal stability of the positive electrodes was understood to become higher when a rate of the volume resistivity of a lithium/phosphate composite with respect to the volume resistivity of a lithium metallic oxide was 0.0315 or less.

TABLE 1

| Positive-Electrode | Active Material | Volume Resistivity (Ω-cm) | $D_{50}$ (μm) |
|---|---|---|---|
| "NCM-1" | $LiNi_{0.5}Co_{0.3}Mn_{0.2}O_2$ | 253 | 5 |
| "NCM-2" | $LiNi_{0.5}Co_{0.2}Mn_{0.3}O_2$ | 991 | 5 |
| "NCM-3" | $LiNi_{1/3}Co_{1/3}Mn_{1/3}O_2$ | 2831 | 5 |
| "LFP-1" | $LiFePO_4$ | 8.4 | 3.2 |
| "LFP-2" | $LiFePO_4$ | 10.9 | 2.5 |
| "LFP-3" | $LiFePO_4$ | 21.8 | 18 |
| "LFP-4" | $LiFePO_4$ | 23.8 | 1.2 |
| "LFP-5" | $LiFePO_4$ | 31.2 | 4 |
| "LFP-6" | $LiFePO_4$ | 485 | 7.6 |
| "LFP-7" | $LiFePO_4$ | 539 | 0.8 |
| "LFP-8" | $LiFePO_4$ | 8310 | 15 |

TABLE 2

| Battery No. | Positive Electrode Component | Positive Electrode "LP"/"LO" Volume-resistance Ratio | Positive Electrode "LFP" Content (% by mass)* | Negative Electrode Component | Nail-penetrated Cell Surface Temperature (° C.) |
|---|---|---|---|---|---|
| Battery 1 | Positive Electrode 1 ("NCM-2" and "LFP-1") | 0.0085 | 24 | Negative Electrode 1 ($SiO_x$) | 80.8 |
| Battery 2 | Positive Electrode 2 ("NCM-2" and "LFP-8") | 8.3838 | ditto | ditto | 583 |
| Battery 3 | Positive Electrode 3 ("NCM-2" and "LFP-4") | 0.0240 | ditto | ditto | 39.2 |
| Battery 4 | Positive Electrode 4 ("NCM-2" and "LFP-5") | 0.0315 | ditto | ditto | 64.3 |
| Battery 5 | Positive Electrode 5 ("NCM-2" and "LFP-6") | 0.4893 | ditto | ditto | 512 |
| Battery 6 | Positive Electrode 6 ("NCM-2" and "LFP-2") | 0.0110 | ditto | ditto | 75.7 |
| Battery 7 | Positive Electrode 7 ("NCM-2" and "LFP-7") | 0.5438 | ditto | ditto | 537 |
| Battery 8 | Positive Electrode 8 ("NCM-2" and "LFP-3") | 0.0220 | ditto | ditto | 101.7 |
| Battery 9 | Positive Electrode 9 ("NCM-1" and "LFP-2") | 0.0430 | ditto | ditto | 567 |
| Battery 10 | Positive Electrode 10 ("NCM-1" and "LFP-3") | 0.0860 | ditto | ditto | 502 |

*Content of Phosphate/Carbon Composite (% by Mass) when Summed Mass of Phosphate/Carbon Composite and Lithium Metallic Oxide was taken as 100% by Mass

Battery 11

Upon fabricating a positive electrode for Battery 11, the following were mixed to make a dispersion liquid: 67-part "NCM-2" serving as a lithium metallic oxide; 27-part "LFP-2" serving as a phosphate/carbon composite; 3-part acetylene black having an average particle diameter of from 0.05 to 0.1 μm and serving as a conductive additive; 3-part polyvinylidene fluoride serving as a binding agent; and NMP serving as a solvent in a total amount of about 54 parts. Note herein that a content of the lithium metallic oxide was 71%, and a content of the phosphate/carbon composite was 29%, when a summed mass of the lithium metallic oxide and phosphate/carbon composite was taken as 100%. Using the dispersion liquid, step b) and step c) were carried out in the same manner as described in Positive Electrode 1 to obtain a positive electrode. The obtained positive electrode was labeled Positive Electrode 11.

Using Positive Electrode 11, a lithium-ion secondary battery was fabricated in the same manner as the manufacturing process for Battery 1. The obtained lithium-ion secondary battery was labeled Battery 11.

Battery 12

Other than using a silicon material as a negative electrode, a lithium-ion secondary battery was fabricated in the same manner as Battery 11.

A production process for the silicon material will be hereinafter described.

(i) Reaction Step

A 500-g HCl aqueous solution with a 35%-by-mass concentration had been held at 10° C. in an argon gas atmosphere. To the HCl aqueous solution, 50-g $CaSi_2$ was added, and was then stirred therewith. After confirming the completion of bubbling from a reaction liquid therein, the mixed solution was further stirred for another four hours under the identical conditions. Thereafter, the mixed solution was subjected to a temperature rise up to room temperature, and then a filtering operation was carried out to the mixed solution. After washing a residue with 300-mL distilled water three times, the residue was further washed with 300-mL ethanol, and was then subjected to reduced-pressure drying to obtain a lamellar silicon compound including a 39.4-g solid lamellar polysilane compound.

(ii) Silicon-material Production Step

The above-mentioned lamellar silicon compound was heated at 900° C. for one hour in an argon atmosphere including $O_2$ in an amount of 1% by volume or less to obtain a silicon material. The silicon material had a structure which was made by laminating multiple pieces of plate-shaped silicon bodies in the thickness direction.

Comparing the case where the negative-electrode active material was $SiO_x$ (i.e., Negative Electrode 1) with the other case where the negative-electrode active material was the above-mentioned silicon material (i.e., Negative Electrode 2), the nail-penetrated cell surface temperature was lower in the latter case than in the former case.

TABLE 3

| Battery No. | Positive Electrode Component | "LP"/"LO" Volume-resistance Ratio | "LFP" Content (% by mass)* | Negative Electrode Component | Initial Discharged Capacity (Ah/g) | Nail-penetrated Cell Surface Temperature (° C.) |
|---|---|---|---|---|---|---|
| Battery 11 | Positive Electrode 11 ("NCM-2" and "LFP-2") | 0.0110 | 29 | Negative Electrode 1 ($SiO_x$) | 4.1 | 56.7 |
| Battery 12 | Positive Electrode 11 ("NCM-2" and "LFP-2") | " | " | Negative Electrode 2 (Silicon Material) | 3.8 | 28.0 |

*Content of Phosphate/Carbon Composite (% by Mass) when Summed Mass of Phosphate/Carbon Composite and Lithium Metallic Oxide was taken as 100% by Mass The above-mentioned silicon material, natural graphite, acetylene black, and polyamide-imide were mixed with each other so that a ratio, the silicon material:the natural graphite:the acetylene black:the polyamide-imide, made 70:15:8:10 by mass ratio. Then, NMP was added to the mixture, so that a slurry-like negative-electrode mixed-material preparation liquid was obtained. Using the negative-electrode mixed-material preparation liquid, a negative electrode was fabricated in the same manner as described in Battery 11. The obtained negative electrode was labeled Negative Electrode 2. Using Negative Electrode 2 and Positive Electrode 11, a lithium-ion secondary battery was fabricated in the same manner as Battery 11. The obtained lithium-ion secondary battery was labeled Battery 12.

Measurement 1 for Initial Discharged Capacity

Batteries 11 and 12 were measured for the initial discharged capacities. The initial discharged-capacity measurement was carried out as described below. After subjecting the batteries to a CC charging (i.e., constant-current charging) mode at a rate of 0.33 C up to a voltage of 4.5 V at room temperature, the batteries were subjected to a CV charging (i.e., constant-voltage charging) mode with a voltage of 4.5 V. Then, the batteries were subjected to a CC discharging (i.e., constant-current discharging) mode with a rate of 0.33 C down to 2.5 V. The thus exhibited discharged capacities were labeled the initial discharged capacities.

The initial discharged capacity of Battery 11 was 4.1 Ah/g. The initial discharged capacity of Battery 12 was 3.8 Ah/g.

Nail Penetration Test 2

To Batteries 11 and 12, a nail penetration test was carried out to measure the battery surface temperatures at the time of short-circuiting internally. The testing method was the same as described in "(Nail Penetration Test 1)." Table 3 shows the results.

The battery surface temperature of Battery 11 was 28° C. The battery surface temperature of Battery 12 was 56.7° C.

Battery 13

Other than setting a content of "LFP-1" at 27% by mass when a summed mass of "NCM-2" and "LFP-1" was taken as 100% by mass, Positive Electrode 13 used in Battery 13 was the same as Positive Electrode 1. A rate of the volume resistivity of "LFP-1" with respect to the volume resistivity of "NCM-2" was 0.0085. Using Positive Electrode 13, a lithium-ion secondary battery was manufactured in the same manner as Battery 1. The obtained lithium-ion secondary battery was labeled Battery 13.

Battery 14

Other than using "LFP-2" as a phosphate/carbon composite, Positive Electrode 14 used in Battery 14 was the same as Positive Electrode 13. A rate of the volume resistivity of "LFP-2" with respect to the volume resistivity of "NCM-2" was 0.0110. Using Positive Electrode 14, a lithium-ion secondary battery was manufactured in the same manner as Battery 1. The obtained lithium-ion secondary battery was labeled Battery 14.

Battery 15

Other than using "NCM-1" as a lithium metallic oxide and using "LPF-2" as a lithium/carbon composite, Positive Electrode 15 used in Battery 15was the same as Positive Electrode 13. A rate of the volume resistivity of "LFP-2" with respect to the volume resistivity of "NCM-1" was 0.0430. Using Positive Electrode 15, a lithium-ion secondary battery was manufactured in the same manner as Battery 1. The obtained lithium-ion secondary battery was labeled Battery 15.

Battery 16

Other than using "NCM-1" as a lithium metallic oxide and using "LFP-3" as a phosphate/carbon composite, Positive Electrode 16 used in Battery 16 was the same as Positive Electrode 13. A rate of the volume resistivity of "LFP-3" with respect to the volume resistivity of "NCM-1" was 0.0860. Using Positive Electrode 16, a lithium-ion secondary battery was manufactured in the same manner as Battery 1. The obtained lithium-ion secondary battery was labeled Battery 16.

Battery 17

Other than using "NCM-1" as a lithium metallic oxide, Positive Electrode 17 used in Battery 17 was the same as Positive Electrode 13. A rate of the volume resistivity of "LFP-1" with respect to the volume resistivity of "NCM-1" was 0.0331. Using Positive Electrode 17, a lithium-ion secondary battery was manufactured in the same manner as Battery 1. The obtained lithium-ion secondary battery was labeled Battery 17.

Nail Penetration Test 3

To Batteries 13 through 17, a nail penetration test was carried out to measure the battery surface temperatures at the time of short-circuiting internally. The testing method was the same as described in "(Nail Penetration Test 1)." Table 4 shows the results. Moreover, FIG. 3 shows the "LP"/"LO" volume-resistance ratios of the various positive electrodes, and the battery surface temperatures.

Figure 3:
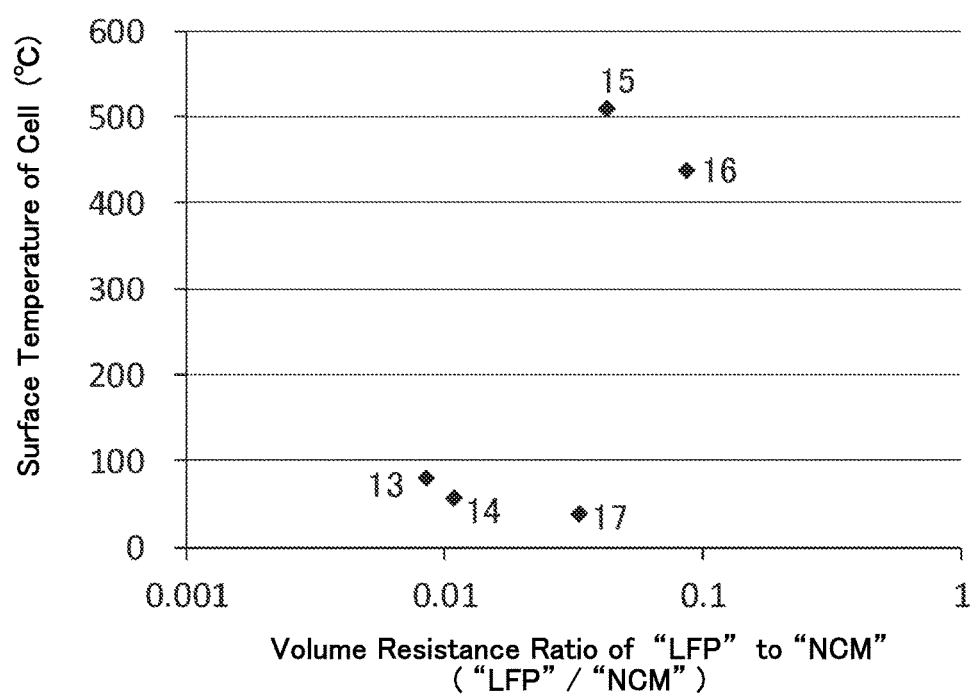
FIG. 3 is another diagram showing relationships between "LP"/"LO" volume-resistance ratios and battery surface temperatures in Batteries 13 through 17.

As shown in FIG. 3 and Table 4, the battery surface temperature was as low as 150° C. or less when the "LP"/"LO" volume-resistance ratio was 0.0331 or less even in such an instance as the content of the phosphate/carbon composite was set at 27% by mass when the summed mass of the lithium metallic oxide and phosphate/carbon composite was taken as 100% by mass. In contrast thereto, the battery surface temperature became as remarkably high as 400° C. or more when the "LP"/"LO" volume-resistance ratio was 0.0430 or more.

Battery 18

Other than setting a content of "LFP-1" at 9.4% by mass when a summed mass of "NCM-2" and "LFP-1" was taken as 100% by mass, Positive Electrode 18 used in Battery 18 was the same as Positive Electrode 1. A rate of the volume resistivity of "LFP-1" with respect to the volume resistivity of "NCM-2" was 0.0085. Using Positive Electrode 18, a lithium-ion secondary battery was manufactured in the same manner as Battery 1. The obtained lithium-ion secondary battery was labeled Battery 18.

Battery 19

Other than using "LFP-2" as a phosphate/carbon composite and setting a content of "LFP-2" at 18.8% by mass when a summed mass of "NCM-2" and "LFP-2" was taken as 100% by mass, Positive Electrode 19 used in Battery 19 was the same as Positive Electrode 18. A rate of the volume resistivity of "LFP-2" with respect to the volume resistivity of "NCM-2" was 0.0110. Using Positive Electrode 19, a lithium-ion secondary battery was manufactured in the same manner as Battery 1. The obtained lithium-ion secondary battery was labeled Battery 19.

Battery 20

Other than using "LFP-4" as a phosphate/carbon composite, Positive Electrode 20 used in Battery 20 was the same as Positive Electrode 19. A rate of the volume resistivity of "LFP-4" with respect to the volume resistivity of "NCM-2" was 0.0240. Using Positive Electrode 20, a lithium-ion secondary battery was manufactured in the same manner as Battery 1. The obtained lithium-ion secondary battery was labeled Battery 20.

Battery 21

Other than using "NCM-3" as a lithium metallic oxide and using "LFP-1" as a phosphate/carbon composite, Positive Electrode 21 used in Battery 21 was the same as Positive Electrode 19. A rate of the volume resistivity of "LFP-1"

TABLE 4

| Battery No. | Positive Electrode Component | "LP"/"LO" Volume-resistance Ratio | "LFP" Content (% by mass)* | Negative Electrode Component | Nail-penetrated Cell Surface Temperature (° C.) |
| --- | --- | --- | --- | --- | --- |
| Battery 13 | Positive Electrode 13 ("NCM-2" and "LFP-1") | 0.0085 | 27 | Negative Electrode 1 ($SiO_x$) | 79 |
| Battery 14 | Positive Electrode 14 ("NCM-2" and "LFP-2") | 0.0110 | ditto | ditto | 57 |
| Battery 15 | Positive Electrode 15 ("NCM-1" and "LFP-2") | 0.0430 | ditto | ditto | 510 |
| Battery 16 | Positive Electrode 16 ("NCM-1" and "LFP-3") | 0.0860 | ditto | ditto | 437 |
| Battery 17 | Positive Electrode 17 ("NCM-1" and "LFP-1") | 0.0331 | ditto | ditto | 39 |

*Content of Phosphate/Carbon Composite (% by Mass) when Summed Mass of Phosphate/Carbon Composite and Lithium Metallic Oxide was taken as 100% by Mass with respect to the volume resistivity of "NCM-3" was 0.0029. Using Positive Electrode 21, a lithium-ion secondary battery was manufactured in the same manner as Battery 1. The obtained lithium-ion secondary battery was labeled Battery 21.

Nail Penetration Test 4

To Batteries 18 through 21, a nail penetration test was carried out to measure the battery surface temperatures at the time of short-circuiting internally. The testing method was the same as described in "Nail Penetration Test 1)." Table 5 shows the results. Moreover, FIG. 4 shows the "LP"/"LO" volume-resistance ratios of the positive electrodes in Batteries 18 through 20, and the battery surface temperatures of Batteries 18 through 20.

Figure 4:
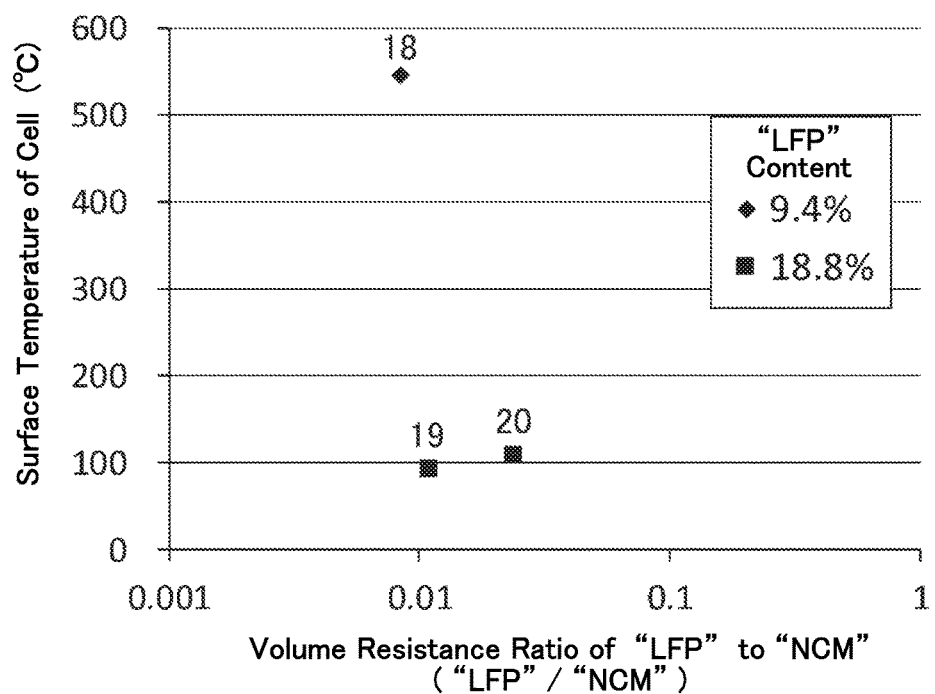
FIG. 4 is still another diagram showing relationships between "LP"/"LO" volume-resistance ratios and battery surface temperatures in Batteries 18 through 20.

As shown in FIG. 4 and Table 5, the battery surface temperature was as low as 150° C. or less when the "LP"/"LO" volume-resistance ratio was 0.0240 or less in such an instance as the content of the phosphate/carbon composite was set at 18% by mass when the summed mass of the lithium metallic oxide and phosphate/carbon composite was taken as 100% by mass. However, the battery surface temperature became as remarkably high as 400° C. or more even when the "LP"/"LO" volume-resistance ratio was 0.0085 in such another instance as the content of the phosphate/carbon composite was set at 9.4% by mass when the summed mass of the lithium metallic oxide and phosphate/carbon composite was taken as 100% by mass.

From the above-mentioned results of Nail Penetration Tests 1 through 4, the following were understood: the "LP"/"LO" volume-resistance ratio being 0.034 or less enables the battery surface temperature to be kept down to less than 400° C. when the nail penetration test is carried out, in such an instance as a content of the phosphate/carbon composite is as high as going beyond 9.4% by mass, or in such a preferable instance as the content is 15% by mass or more, when a summed mass of the lithium metallic oxide and phosphate/carbon composite is taken as 100% by mass.

The following were mixed each other: 98-part-by-mass spherical graphite serving as a negative-electrode active material; and 1-part-by-mass styrene-butadiene rubber as well as 1-part-by-mass carboxymethyl cellulose, both of which serve as a binding agent. The mixture was dispersed in a proper amount of ion-exchanged water to prepare a slurry. As a current collector for negative electrode, a copper foil with a thickness of 10 μm was made ready. Onto a surface of the copper foil, the aforementioned slurry was applied in a film shape using a doctor blade. The copper foil with the slurry applied thereon was dried to remove the water. Thereafter, the copper foil was pressed to obtain a joined substance. Then, the obtained joined substance was dried by heating with a vacuum drier at 100° C. for six hours. Thus, a copper foil, on which a negative-electrode active-material layer was formed, was obtained. The copper foil with the negative-electrode active-material layer formed thereon was labeled Negative Electrode 3.

Using Negative Electrode 3 and Positive Electrode 11, a lithium-ion secondary battery was fabricated in the same manner as Battery 11. The obtained lithium-ion secondary battery was labeled Battery 22.

Battery 23

Other than using "NCM-3" as a lithium metallic composite oxide, a positive electrode used in Battery 23 was the same as Positive Electrode 11 used in Battery 22. A negative electrode used in Battery 23 was the same as Negative Electrode 3 in Battery 22.

Nail Penetration Test, and
Initial-Discharged-Capacity Measurement

Initial discharged capacities and nail-penetrated battery surface temperatures of Batteries 22 and 23 were measured.

TABLE 5

| Battery No. | Positive Electrode | | | Negative Electrode Component | Nail-penetrated Cell Surface Temperature (° C.) |
|---|---|---|---|---|---|
| | Component | "LP"/"LO" Volume-resistance Ratio | "LFP" Content (% by mass)* | | |
| Battery 18 | Positive Electrode 18 ("NCM-2" and "LFP-1") | 0.0085 | 9.4 | Negative Electrode 1 (SiO$_x$) | 545 |
| Battery 19 | Positive Electrode 19 ("NCM-2" and "LFP-2") | 0.0110 | 18.8 | ditto | 90 |
| Battery 20 | Positive Electrode 20 ("NCM-2" and "LFP-4") | 0.0240 | ditto | ditto | 107 |
| Battery 21 | Positive Electrode 21 ("NCM-3" and "LFP-1") | 0.0029 | ditto | ditto | 56 |

*Content of Phosphate/Carbon Composite (% by Mass) when Summed Mass of Phosphate/Carbon Composite and Lithium Metallic Oxide was taken as 100% by Mass Battery 22

A positive electrode used in Battery 22 was the same as Positive Electrode 11 used in Battery 11. A negative electrode used in Battery 22 was manufactured as described below.

The measurements of the initial discharged capacities and nail-penetrated battery surface temperatures were carried out in the same manner as described in aforementioned "(Initial-discharged-capacity Measurement 1" and "(Nail Penetration Test 1)." Table 6 shows results of the measurements.

TABLE 6

| Battery No. | Positive Electrode Component | "LP"/"LO" Volume-resistance Ratio | "LFP" Content (% by mass)* | Negative Electrode Component | Initial Discharged Capacity (Ah/g) | Nail-penetrated Cell Surface Temperature (° C.) |
|---|---|---|---|---|---|---|
| Battery 22 | Positive Electrode 11 ("NCM-2" and "LFP-2") | 0.011 | 29 | Negative Electrode 3 (Spherical Graphite) | 2.4 | 98 |
| Battery 23 | Positive Electrode 12 ("NCM-3" and "LFP-2") | 0.0039 | 29 | Negative Electrode 3 (Spherical Graphite) | 2.4 | 152 |

*Content of Phosphate/Carbon Composite (% by Mass) when Summed Mass of Phosphate/Carbon Composite and Lithium Metallic Oxide was taken as 100% by Mass According to the above-mentioned results of the measurements, the nail-penetrated cell surface temperatures were comparatively low when the volume-resistance ratio (or the "LP"/"LO" volume-resistance ratio) between the phosphate/carbon composite and lithium metallic oxide included in the positive electrode was 0.034 or less, and moreover when the "LFP" content was from 15% by mass or more to 35% by mass or less, even in such an instance as the negative-electrode active material was a carbon-based material like the spherical graphite (e.g., Negative Electrode 3).

Moreover, comparing the results shown in Table 3 and Table 6 with each other, the nail-penetrated cell surface temperature was lower in such an instance as the negative-electrode active material comprised Si (e.g., Negative Electrodes 1 and 2) than in such another instance as the negative-electrode active material was a carbon-based material (e.g., Negative Electrode 3).

The invention claimed is:

1. A positive electrode for lithium-ion secondary battery, the positive electrode comprising:
    a lithium metallic oxide with a lamellar rock-salt structure including nickel, cobalt, and manganese; and
    a phosphate/carbon composite including an olivine-type phosphate compound at least some of which is coated with carbon partially;
    the olivine-type phosphate compound being expressed by a general formula: $LiM_hPO_4$ (where "M" is at least one element selected from the group consisting of Mn, Fe, Co, Ni, Cu, Mg, Zn, V, Ca, Sr, Ba, Ti, Al, Si, B, Te and Mo, and $0<"h"<2$);
    a rate of a volume resistivity of the phosphate/carbon composite with respect to a volume resistivity of the lithium metallic oxide being 0.034 or less;
    a content of the phosphate/carbon composite being from 15% by mass or more to 35% by mass or less when a summed mass of the lithium metallic oxide and the phosphate/carbon composite is taken as 100% by mass.

2. The positive electrode for lithium-ion secondary battery as set forth in claim 1 further comprising a conductive additive.

3. The positive electrode for lithium-ion secondary battery as set forth in claim 1, wherein an average particle diameter of the phosphate/carbon composite is from 0.8 μm or more to 18 μm or less.

4. The positive electrode for lithium-ion secondary battery as set forth in claim 1, wherein a coating amount of carbon in the phosphate/carbon composite is from 1% by mass or more to 3.5% by mass or less.

5. A lithium-ion secondary battery comprising:
    the positive electrode as set forth in claim 1;
    a negative electrode; and
    a nonaqueous electrolytic solution.

6. The lithium-ion secondary battery as set forth in claim 5, wherein the negative electrode includes Si.

7. The lithium-ion secondary battery as set forth in claim 6, wherein the negative electrode includes a silicon material having a structure made by laminating multiple pieces of plate-shaped silicon bodies in a thickness direction thereof.

8. A process for producing the positive electrode for lithium-ion secondary battery as set forth in claim 1, the process comprising:
    a confirmation step of confirming whether a rate of a volume resistivity of the phosphate/carbon composite with respect to a volume resistivity of the lithium metallic oxide is 0.034 or less.

* * * * *